United States Patent [19]
Weber

[11] 3,940,872
[45] Mar. 2, 1976

[54] FISHING DEVICE
[76] Inventor: Russell W. Weber, 8000 W. Bender Road, Milwaukee, Wis. 53218
[22] Filed: Mar. 24, 1975
[21] Appl. No.: 561,578

[52] U.S. Cl. ............................................... 43/43.13
[51] Int. Cl.² ........................................ A01K 95/00
[58] Field of Search............ 43/43.13, 43.12, 42.04, 43/42.49

[56] References Cited
UNITED STATES PATENTS

| | | | |
|---|---|---|---|
| 3,583,089 | 6/1971 | Scarbro | 43/42.04 |
| 3,643,370 | 2/1972 | Cook | 43/43.12 |
| 3,755,955 | 9/1973 | Saia | 43/43.13 |
| 3,816,954 | 6/1974 | Bissonette | 43/43.12 |
| 3,879,884 | 4/1975 | Tucker, Sr. | 43/43.12 |

Primary Examiner—Warner H. Camp
Attorney, Agent, or Firm—Arthur L. Morsell, Jr.

[57] ABSTRACT

A flat plate has means for connecting a fish bait to the rear portion thereof and has a link swingably attached to the front portion thereof with an eye on the end of the link for attachment to a trolling line. An upstanding fin projects from the top of the plate and has a slot located in the forward portion of the fin and extending obliquely rearwardly of the plate for receiving and detachably holding the link in a position which causes the plate to dive when it is drawn through the water. The sides of the slot are flexible and there is an adjustment screw to adjust the amount of force required to detach the link from the slot.

10 Claims, 6 Drawing Figures

U.S. Patent    March 2, 1976    3,940,872
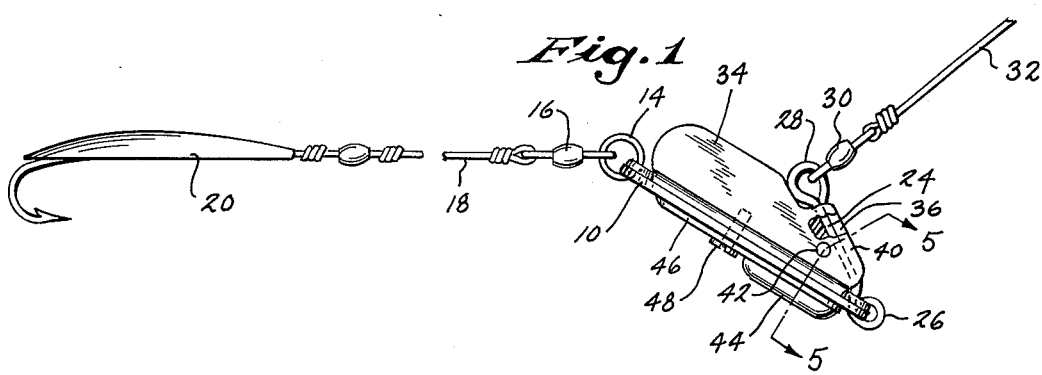
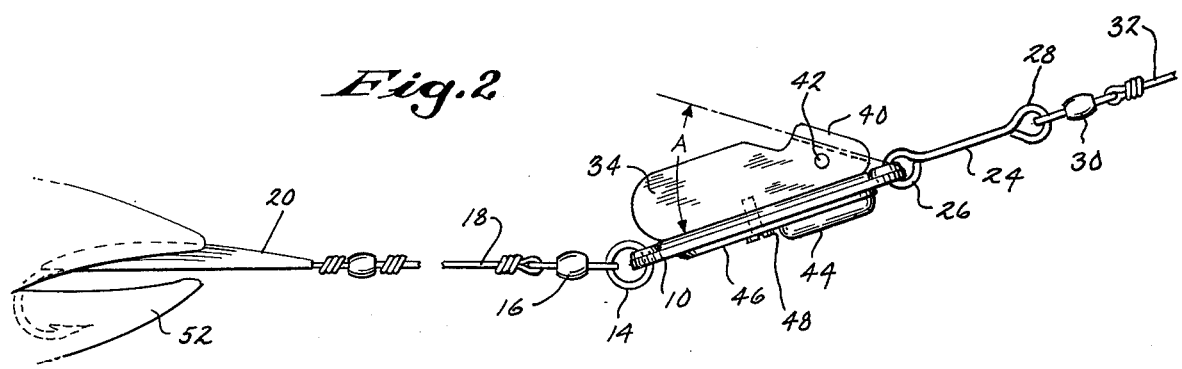
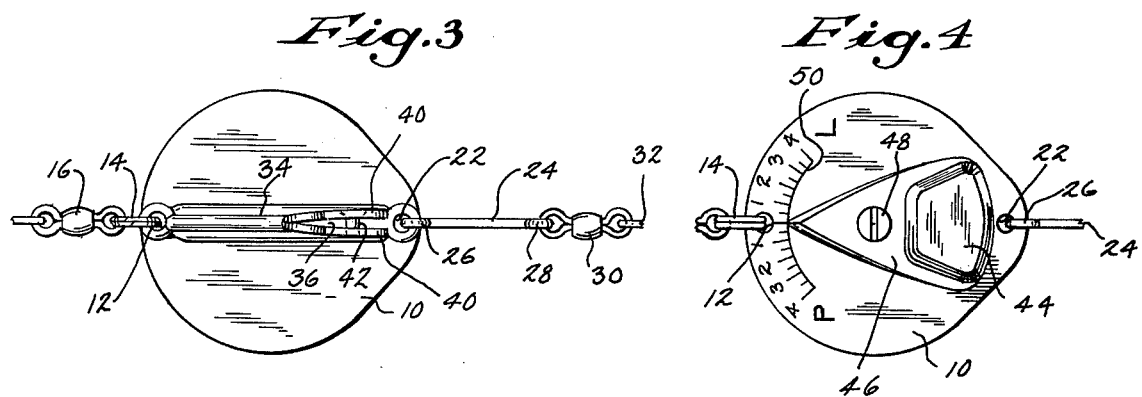
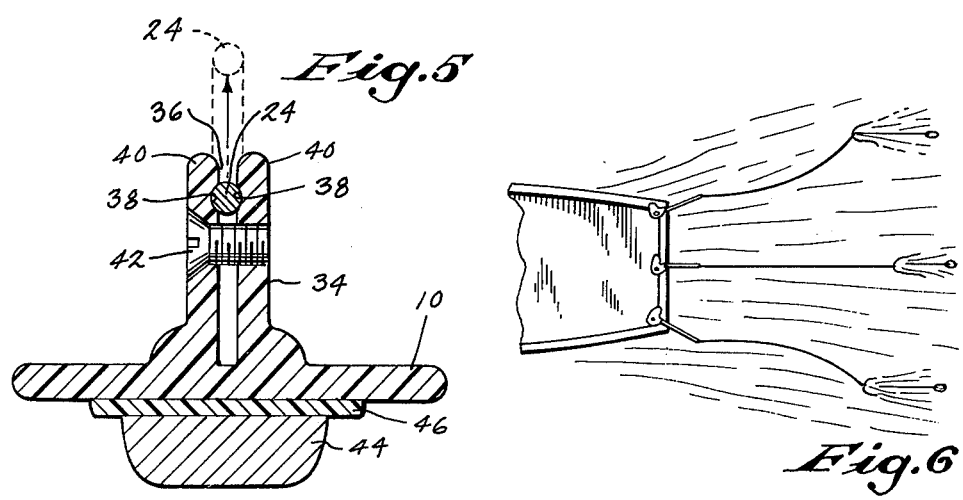

FISHING DEVICE

BACKGROUND OF THE INVENTION

Diving sinkers are used in ocean fishing and in great lakes fishing to carry the bait down to deep feeding fish. Typical prior art diving sinkers are disclosed in my co-pending U.S. Pat. application Ser. No. 407,341, now U.S. Pat. No. 3,844,059, and in U.S. Pat. No. 3,643,370 to Cook et al. In both disclosures, a flat plate has means on its rear end for connecting a fish bait thereto and has a link swingably attached to the front portion of the plate with an eye on the link for attachment to a trolling line. In the sinker of my U.S. Pat. No. 3,844,059, the link is detachably held in a position to cause the flat plate to dive by a spring wire extending forwardly and upwardly from the rear of the flat plate. A hook on the end of the spring detachably engages an eye on the end of the link. When a fish strikes the bait, the striking force applied to the rear of the plate causes the link to detach from the spring and allows the link to swing forwardly to a position which causes the flat plate to rise. In this diving sinker, the amount of force necessary to detach the swingable link depends on the strength of the spring and is not adjustable. Furthermore, assembly is time-consuming.

In the diving sinker of U.S. Pat. No. 3,643,370, the swingable link has a small ball on its end which is detachably engaged in a pair of jaws on a flexible support which extends upwardly from the flat plate. When a fish strikes the bait, the striking pressure causes the ball to snap out of the jaws and permits the link to swing to a position which causes the flat plate to rise. An adjustment screw is threadably attached between the jaws to adjust the force required to snap the ball free. This diving sinker is adjustable, but it is inconvenient to use because the small size of the detachable ball and the jaws makes it difficult to snap the ball into the jaws, and the ball is on a loose hanging extension.

SUMMARY OF THE INVENTION

In accordance with this invention, the swingable link of a diving sinker is detachably engaged in a slot on the leading edge of a vertical stabilizing fin that projects upwardly from the top of the flat plate to serve dual purposes. The slot extends obliquely rearwardly and has flexible sides into and out of which the swingable link may be snapped. A screw is threadably engaged between the sides of the slot to adjust the amount of force required to snap the swingable link out of the slot. An eye is formed on the upper end of the swingable link to receive a trolling line. The eye extends beyond the upper end of the slot and provides a means by which the swingable link can be conveniently grasped to snap it into the slot.

DESCRIPTION OF THE DRAWINGS

FIG. 1 is a side elevational view of one embodiment of the invention with the swingable link thereof snapped into the slot thereof to cause the sinker to dive.

FIG. 2 is a side elevational view of the embodiment of FIG. 1 with the swingable link thereof detached from slot thereof.

FIG. 3 is a top view of the embodiment shown in FIGS. 1 and 2 with the swingable link thereof detached from the slot.

FIG. 4 is a bottom view of the embodiment shown in FIGS. 1–3 with the swingable link thereof detached from the slot.

FIG. 5 is a cross-sectional view taken on the line 5—5 of FIG. 1.

FIG. 6 is a top view showing several persons fishing off the stern of a boat and using the diving sinkers shown in FIGS. 1–5.

DESCRIPTION OF THE PREFERRED EMBODIMENT

Referring to the drawing, the preferred embodiment comprises a flat plate 10 (FIGS. 3–5) which has an opening 12 (FIG. 3) in its rear end through which a ring 14 is engaged to enable a fishing line to be connected thereto. A swivel 16, fishing line 18, and artificial bait 20 are connected to ring 14 and trail from the rear of flat plate 10 when it is drawn through the water.

An opening 22 (FIGS. 3 and 4) is formed in the front end of flat plate 10. A rigid link 24, preferably formed of relatively stiff metal wire, is swingably engaged in opening 22 by means of an eye 26 formed at the lower end of link 24. Another eye 28 is formed on the upper end of link 24 to enable a trolling line to be attached thereto. A swivel 30 is attached to eye 28 and a trolling line 32 is attached to swivel 30.

A vertical stabilizing fin 34 projects upwardly from the top of flat plate 10. In this embodiment of the invention, flat plate 10 is made of plastic and vertical fin 34 is also of plastic and is integrally molded with flat plate 10. However, other constructions are possible, i.e. vertical fin 34 can be attached to flat plate 10 by cement or by screws.

The leading edge of vertical fin 34 slopes obliquely rearwardly toward flat plate 10 and is slotted at 36 (FIGS. 1 and 5) to detachably receive and hold rigid link 24. Slot 36 is grooved at 38 on both sides (FIG. 5) to receive link 24. The sides 40 of slot 36 are flexible to enable link 24 to be snapped into and out of grooves 38. An adjustment screw 42 (FIG. 5) is threadably engaged between the sides 40 to adjust the spacing of sides 40 and thus to adjust the amount of force required to snap link 24 out of grooves 38 of slot 36.

As shown in FIG. 1, the line-connection eye 28 at the upper end of link 24 extends above slot 36 and can be easily grasped by the fingers to snap link 24 into and out of grooves 38 of slot 36. This is an important feature of the invention, because link 24 must be snapped into grooves 38 before the sinker is ready for use.

A lead weight 44 is attached to a flat pointer 46 which is rotatably adjustably attached to the bottom of flat plate 10 by a screw 48. A scale 50 (FIG. 4) is marked on the bottom of flat plate 10 opposite the end of pointer 46. Lead weight 44 can be manually moved to the right or left by rotating pointer 46 about screw 48. This enables the steering of the flat plate 10 to the right or the left as it is drawn through the water, e.g. to prevent the tangling of lines of several fishermen who may be simultaneously trolling off the rear of a fishing boat as shown in FIG. 6. Adjustable weight 44 is desirable but it is not an essential feature of the invention, which can utilize either a fixed weight or no weight at all except for the intrinsic weight of flat plate 10 and vertical fin 34. In cases where plate 10 and vertical fin 34 are made of metal, no additional weight will be required.

To use this embodiment of the invention, link 24 is manually snapped into the grooves 38 of slot 36 as shown in FIG. 1. The sinker and artificial bait 20 are then thrown over the rear of the boat and line is reeled out until bait 20 is the desired distance from the rear of the boat. Trolling line 32 is then held fast and draws the sinker and bait 20 through the water as the boat moves forward. As the sinker is drawn through the water, the position of eye 28 causes flat plate 10 to turn downwardly at an angle to trolling line 32 and causes the sinker to dive until it reaches a depth at which the downward diving tendency of flat plate 10 is counterbalanced by the upward force on trolling line 32 due to its forward movement through the water. This equilibrium depth can be pre-set to any desired level by varying the angle A (FIG. 2) between slot 36 and flat plate 10 and by varying the length of link 24, the size of flat plate 10, and the weight 44. The control of the above-noted factors to achieve any desired equilibrium level are well known to those skilled in the art. At the equilibrium depth, the relationship between trolling line 32, bait 20, and flat plate 10 is approximately as shown in FIG. 1.

When a fish 52 (FIG. 2) strikes bait 20, the force of the strike causes link 24 to snap out of grooves 38 of slot 36 and to swing forwardly. This raises the leading edge of flat plate 10 and aligns it with trolling line 32, thereby causing the sinker and bait 20 to tend to rise, which assists in bringing the fish to the surface. After the fish has been landed, link 24 is manually snapped back into grooves 38 of slot 36, and the sinker and bait 20 are thrown back into the water for further trolling.

The amount of force required to snap link 24 out of grooves 38 can be checked manually by snapping link 24 into and out of grooves 38 and determining the amount of force by feel. If necessary, the amount of force involved can be adjusted by turning adjustment screw 42 with a screwdriver. The amount of force required to snap link 24 out of grooves 38 is preferably set high enough to prevent link 24 from snapping free when bait 20 touches the bottom or is pulled through weeds, but is set low enough to allow link 24 to snap free when a fish strikes bait 52.

In addition to providing the structure which forms grooves 38 of slot 36, vertical stabilizing fin 34 also serves to guide the diving sinker as it is drawn through the water and to prevent it from wobbling. In this particular embodiment, vertical fin 34 extends almost the full length of flat plate 10, but this is not an essential feature of the invention. If desired, vertical fin 34 can be terminated at the rear end of slot 36.

Another advantage of this invention is that it does not have any loose balls or rings that hang free when the swingable link is disengaged from its holder such as are used in the prior art sinkers described in the above-noted U.S. Pat. No. 3,643,370.

Various changes and modifications may be made without departing from the spirit of the invention, and all of such changes are contemplated as may come within the scope of the claims.

What I claim is:

1. In a diving sinker having a flat plate, having means at the rear of said plate for connecting a fish bait thereto, having link means swingably attached to the front of said plate, there being an eye on said link means to which a trolling line can be attached, the improvement comprising an upstanding vertical fin on top of said plate, and an elongated slot having flexible sides located in a forward portion of said fin and extending obliquely rearwardly toward the plate for receiving and detachably holding said link means in a position which causes said plate to extend at an angle to said trolling line, thereby causing said plate to dive as it is drawn through the water.

2. The diving sinker of claim 1 wherein said fin extends rearwardly beyond the end of said slot over a major portion of said plate.

3. The diving sinker of claim 1 wherein said eye is located on one end of said link and lies beyond said slot when said link is positioned within said slot, thereby providing a convenient finger hold for snapping said link into said slot.

4. The diving sinker of claim 3 wherein there is a second eye on the end of said link means which is swingably attached to said plate and wherein there is an opening in the front end of said plate for receiving said second eye.

5. The diving sinker of claim 4 wherein said link means is made of a length of wire and has eyes formed on both ends thereof.

6. The diving sinker of claim 1 wherein said link means is rigid.

7. The diving sinker of claim 1 and further comprising an adjustment screw threadably engaged in a forward portion of said fin adjacent said slot for adjusting the distance between the sides of said slot to adjust the amount of force required to detach said link means from said slot.

8. The diving sinker of claim 1 wherein the sides of said slot are grooved to removably receive said link.

9. The diving sinker of claim 1 in which said flat plate and fin are integral with one another.

10. The diving sinker of claim 1 in which said flat plate and fin are an integral plastic molding.

* * * * *